United States Patent Office 2,934,543
Patented Apr. 26, 1960

2,934,543
NEW HYDROPHENANTHRENE COMPOUNDS AND PROCESS FOR THEIR MANUFACTURE

Tadeus Reichstein, Albert Wettstein, Georg Anner, Jean-René Billeter, and Karl Heusler, Basel, Robert Neher, Binningen, Julius Schmidlin, Basel, Hellmut Ueberwasser, Riehen, and Peter Wieland, Basel, Switzerland; said Wettstein, Anner, Billeter, Heusler, Neher, Schmidlin, Ueberwasser, and Wieland, assignors to said Reichstein No Drawing. Application May 16, 1956
Serial No. 585,167

Claims priority, application Switzerland January 15, 1954

23 Claims. (Cl. 260—340.9)

This application is a continuation in part of our copending application Serial No. 480,062, filed January 5, 1955, now abandoned.

The highly active hormone of the suprarenal gland which is responsible for the regulation of the mineral metabolism in the human body is known to be a pregnene compound of the following formulae which obviously represent an equilibrium.

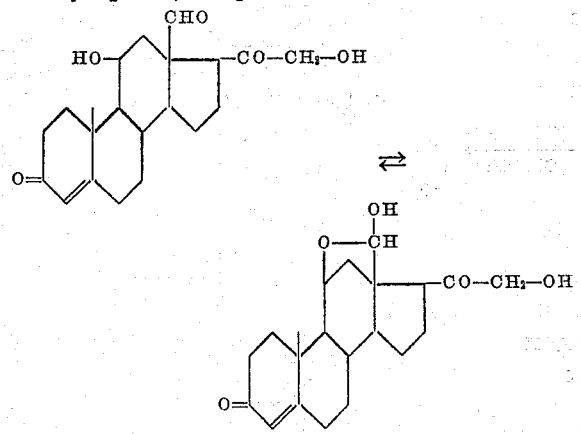

Since this important hormone has so far been available only by a tedious extractive procedure from suprarenal glands of animals and could only be obtained in very low yield (40 to 95 mg. from 1000 kilos of fresh beef adrenals), a synthesis of this hormone and closely related 18-oxygenated hormones (e.g. the 18-hydroxy compound corresponding to aldosterone, viz. $\Delta^4$-3:20-dioxo-11$\beta$:18:21-trihydroxypregnene, that is 18-hydroxy-corticosterone which shows a similar high physiological activity) from readily available compounds either from other naturally occurring steroids or a total synthesis is of extraordinary technical importance.

The present invention thus provides a series of intermediates which can readily be converted into aldosterone or into the 18-hydroxy-corticosterone, thus making these hormones available in sufficient quantity.

The present application more specifically relates to compounds of the formula

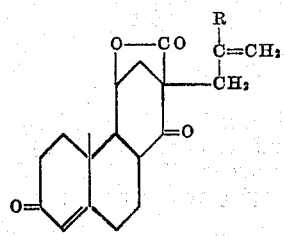

and 3-ketals thereof, in which formula R stands for a hydrogen atom or a methyl group.

These new compounds are obtained when a compound of the formula

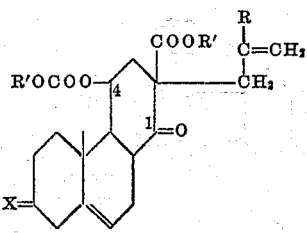

wherein X stands for a ketalized oxo group, R for a hydrogen atom or a methyl group and R' for a lower alkyl group is treated with a reducing agent capable of reducing a keto group to a carbinol group, such as an alkalimetal borohydride, followed by alkaline hydrolysis of the ester grouping, lactonization of the carboxyl group in the 2-position with the hydroxyl group in the 4-position and oxidation of the hydroxyl group in the 1-position to an oxo group.

For the reduction of the oxo group in the 1-position to a hydroxyl group according to the process of the invention there are suitable primarily complex light metal hydrides, in particular sodium borohydride or lithium borohydride. The reaction is carried out in a suitable solvent, preferably an alcohol.

After the reduction of the oxo-group in the 1-position, the esterified groups in the 2- and 4-position are hydrolized under alkaline condition, for example with an alkali metal hydroxide in a partly aqueous solution e.g. in an aqueous-alcoholic solution. In order to shorten the reaction time it is of advantage to heat the reaction mixture to a temperature of about 50–100° C. The reduction of the oxo group and the hydrolysis of the ester functions can be effected in the same reaction vessel without isolation of the intermediate product by simply adding water and the alkalimetal hydroxide, e.g. potassium hydroxide to the reducing mixture.

Upon acidification of the solution, the resulting hydroxy-acid partly lactonizes spontaneously. Lactonization is completed by heating the acid in an inert solvent, such as benzene.

The dehydrogenation of the hydroxyl group in the 1-position to an oxo group can be effected by various methods, particularly by using derivatives of hexavalent chromium. It has been observed that very satisfactory results are obtained with the chromium trioxide-pyridine complex, especially at a slightly elevated temperature. The compounds obtained in the above described reaction sequence are important intermediates in a process for the production of aldosterone. This process, which is described in detail in our copending applications Serial No. 585,142, filed May 16, 1956, now abandoned, and Serial No. 585,168, filed May 16, 1956, now abandoned, and Serial No. 585,144, filed May 16, 1956, now abandoned, and Serial No. 585,143, filed May 16, 1956, is illustrated in the following diagram of formulae:

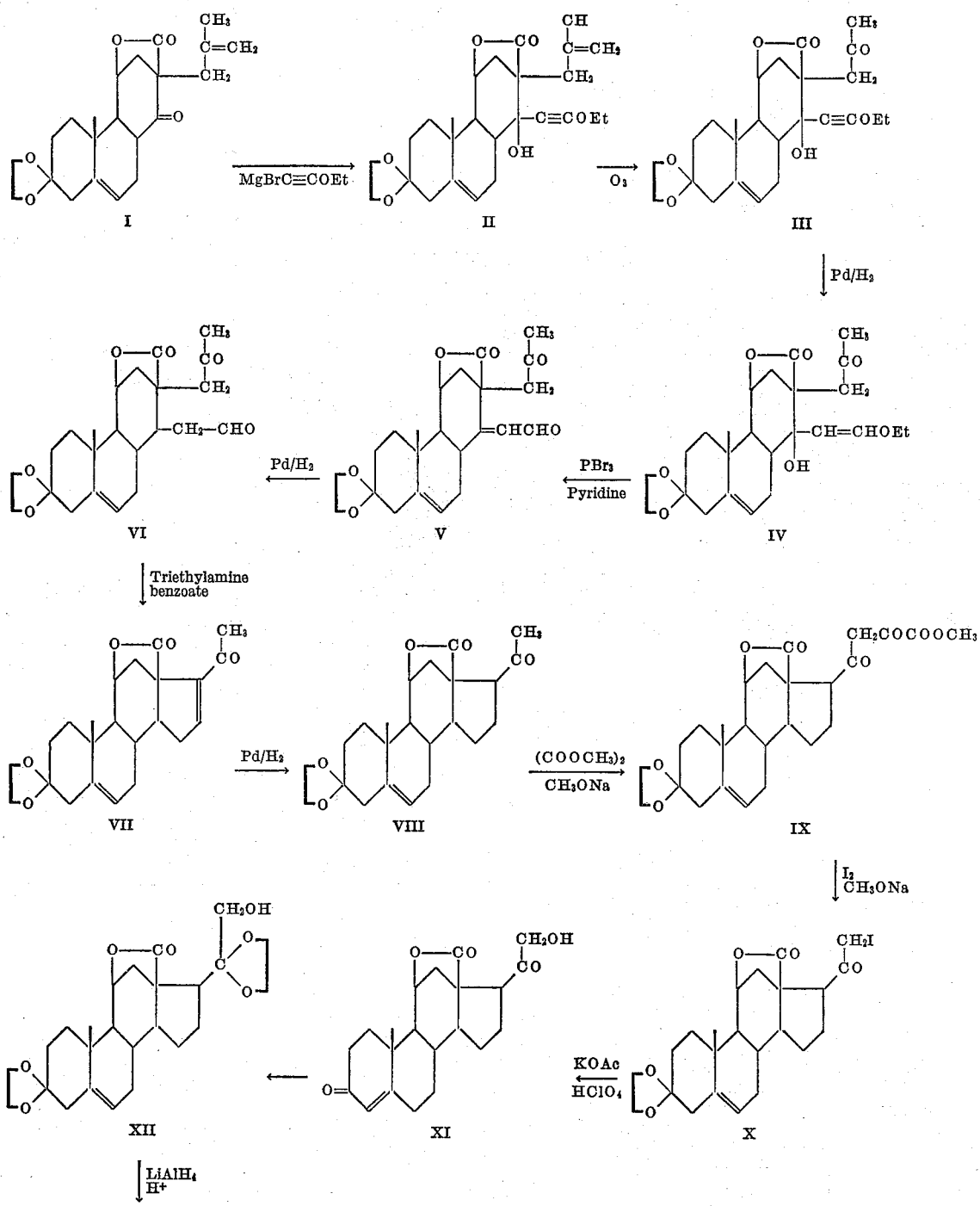

The allyl-lactone corresponding to I is converted into the substance corresponding to II which after hydroxylation with osmium tetroxide gives XIII.

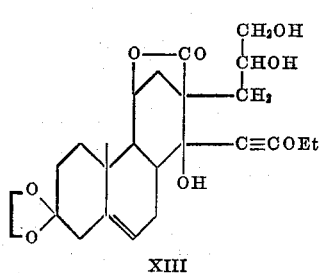

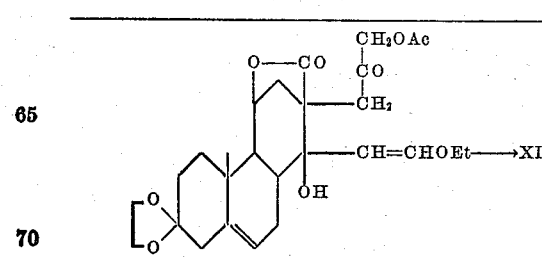

Partial esterification of the primary hydroxyl group followed by reduction of the ethinyl group to the ethenyl group (analogous to III→IV) and oxidation of the secondary hydroxyl group to an oxo group with pyridine-chromium trioxide complex gives XIV, which in a reaction sequence analogous to the conversion IV→VIII followed by ketal splitting gives XI, which is easily converted into aldosterone.

The starting materials for the process claimed are prepared from known hydrophenanthrene compound, especially from 4bβ-methyl-7-ethylenedioxy-1:2:3:4:4aα:4b: 5:6:7:8:10:10aβ-dodecahydrophenanthrene - 1 - one-4β-ol by condensation with a dialkyl carbonate such as dimethyl or diethylcarbonate in the presence of an alkaline condensing agent, e.g. sodium hydride, sodamide or sodium ethoxide. During this condensation not only a 2-carbalkoxy group is introduced but the 4β-hydroxy group is simultaneously esterified to yield an alkoxy-carbonyloxy group. The β-ketoester thus obtained is alkylated in the 2-position with an allyl- or methallyl halide, especially with an iodide to give a mixture of stereoisometric products which may or may not be separated before reduction with an alkali metal borohydride according to the invention: The two isomers are easily distinguished after completion of the process claimed, since only the alkylation product in which the 2-carboxyl group is β-orientated (and consequently the allyl or methallyl group in the α-orientation) is capable of forming a lactone with the 4β-hydroxyl group.

The following examples illustrate the invention:

Example 1

A solution of 0.981 part of 2α-methallyl-2β-carbethoxy-4β-ethoxycarboxy-4bβ-methyl-7-ethylene-dioxy - 1:2:3:4: 4aα:4b:5:6:7:8:10:10aβ - dodecahydrophenanthrene - 1-one melting at 99.5–101° C. and 0.840 part of sodium borohydride in 25 parts by volume of anhydrous ethanol is stirred for 16 hours at room temperature. The solution is then added dropwise to an ice cold mixture of 11 parts by volume of 4-molar sodium dihydrogen phosphate solution and 19.5 parts by volume of water, the reaction vessel is rinsed with a mixture of 10 parts by volume of water and 5 parts by volume of ethanol and the aqueous solution is concentrated in vacuo at room temperature to 12–15 parts by volume. The resulting suspension is extracted with methylene chloride, the extracts washed with water, dried with sodium sulfate, filtered and evaporated. For the purpose of purification, the residue is dissolved in a mixture of hexane and benzene (9:1) and chromatographed over 49 parts of Florida bleaching earth by the fractional elution method. With mixtures of hexane and benzene (9:1) and (1:1) only insignificant quantities of substance are removed. The fractions extracted with benzene, mixtures of benzene and ether (9:1) and (1:1) yield by recrystallization from petroleum ether pure 2α-methallyl-2β-carbethoxy - 4β-ethoxycarboxy-4bβ-methyl-7 - ethylene-dioxy - 1:2:3:4:4aα:4b:5:6:7:8:10:10aβ-dodecahydrophenanthrene-1-ol melting at 92–94.5° C.

The same compound is obtained if the following procedure is carried out: To a solution prepared in a dry atmosphere of nitrogen of 12.260 parts of 2α-methallyl-2β - carbethoxy-4β-ethoxycarboxy-4bβ-methyl-7-ethylene - dioxy - 1:2:3:4:4aα:4b:5:6:7:8:10:10aβ - dodecahydrophenanthrene-1-one in 312.5 parts by volume of anhydrous ethanol there are added 10.50 parts of sodium boronhydride at 20–25° C. The mixture is stirred for 40 hours at room temperature. It is then poured on to a mixture of 157.5 parts by volume of a 4-molar sodium dihydrogen phosphate solution and 315 parts of ice and the reaction vessel is rinsed with 150 parts by volume of ice cold water. The reduction product is extracted with ether, the ethereal extract washed with 2-molar sodium dihydrogen phosphate solution and with water, dried with sodium sulfate and evaporated. By crystallization of the residue from isopropyl ether and pentane there is obtained 2α - methallyl - 2β - carbethoxy-4β-ethoxycarboxy - 4bβ-methyl - 7 - ethylene-dioxy-1:2:3:4:4aα:4b:5:6:7:8:10: 10aβ-dodecahydrophenanthrene-1-ol which can be obtained in two modifications, of which the stable form melts at 99–101° C., and the labile form at 94° C. with transformation.

A solution of 1.646 parts of 2α-methallyl-2β-carbethoxy - 4β - ethoxycarboxy - 4bβ-methyl-7-ethylene-dioxy-1: 2:3:4:4aα:4b:5:6:7:8:10:10aβ - dodecahydrophenanthrene-1-ol in 46.07 parts by volume of anhydrous ethanol is mixed with a solution of 14.72 parts of potassium hydroxide in 11.51 parts by volume of water. The mixture is heated in a bath of 90–95° C. for 1 hour with stirring in an atmosphere of nitrogen and then cooled in ice water. 128.7 parts by volume of water are added, carbon dioxide is introduced until a spot test on thymol phthalein paper is no longer positive, and the mixture is extracted with methylene chloride to separate off slight quantities of neutral substances. By cautiously acidifying the remaining sodium carbonate alkaline solution with 5-molar phosphoric acid to a pH value of 5, extracting with methylene chloride, washing the extracts with water, drying with sodium sulfate and evaporating, there is obtained the resulting 2α-methallyl-2β-carboxy-4bβ-methyl-7-ethylene-dioxy-1:2:3:4:4aα:4b:5:6:7:8:10: 10aβ-dodecahydrophenanthrene-1:4β-diol which partially lactonizes in the course of being worked up. The crystalline crude product is dissolved in 130 parts by volume of boiling benzene, the solution is boiled for 3 minutes to complete the lactonization, and the benzene is then distilled in vacuo. The residue is recrystallized from ether, using methylenechloride as solution promoter. There is thus obtained the pure (2→4β)-lactone of 2α-methallyl-2β-carboxy-4bβ-methyl-7-ethylene-dioxy-1:2:3:4:4aα:4b: 5:6:7:8:10:10aβ - dodecahydrophenanthrene - 1:4β - diol melting at 246–249° C.

To a suspension of the chromium trioxide-pyridine complex prepared in a dry atmosphere of nitrogen from 25.15 parts of chromium trioxide and 750 parts by volume of anhydrous pyridine there is added a solution of 9.363 parts of (2→4b)-lactone of 2α-methallyl-2β-carboxy-4bβ-methyl-7-ethylene-dioxy-1:2:3:4:4aα:4b:5:6:7: 8:10:10aβ-dodecahydrophenanthrene-1:4β-diol in 250 parts by volume of anhydrous pyridine at once and heated to 60–65° C. for 14 hours with stirring. After cooling, the pyridine is carefully distilled off in vacuo until only a small quantity remains, 500 parts of ice are added to the moist residue and, after adding 625 parts by volume of ice water, the whole is vigorously agitated with a mixture of 3750 parts by volume of ether and 1250 parts by volume of methylene chloride. The resulting emulsion is filtered with suction from the solid portions through a filter aid, the upper phase of the filtrate is washed with 4-molar sodium dihydrogen phosphate solution and with water, dried with sodium sulfate and evaporated. The crystalline crude dehydrogenation product is dissolved in benzene, the solution filtered through a layer of activated carbon to remove the color, and the filtrate evaporated in vacuo. By recrystallization of the residue from ether using methylene chloride as solution promoter there is obtained (2→4β)-lactone of 2α-methallyl - 2β - carboxy - 4bβ-methyl-7-ethylene-dioxy-1:2:3:4: 4aα:4b:5:6:7:8:10:10aβ - dodecahydrophenanthrene - 4β-ol-1-one melting at 188–190° C.

Example 2

3.2 parts of the mixture of the 2-allyl-2-carbethoxy-4β - ethoxycarboxy - 4bβ-methyl-7-ethylene-dioxy-1:2:3: 4:4aα:4b:5:6:7:8:10:10aβ-dodecahydrophenanthrene - 1-one epimeric at the carbon atom 2, are dissolved in 100 parts by volume of absolute alcohol, 2.5 parts of sodium borohydride are admixed, and the whole allowed to stand at about 20° C. for 3 days. The mixture is then rendered slightly acid with dilute acetic acid, the alcohol evaporated under reduced pressure, the residue taken up in a mixture of chloroform and ether (1:3), washed with water, sodium carbonate solution, and water, and dried over sodium sulfate. The solution is evaporated and yields 3.13 parts of a crude product from which there is obtained by crystallization from a mixture of ether and petroleum ether 0.680 part of 2α-hydroxymethyl-2β-allyl-4β-ethoxy-carboxy-4bβ-methyl-7-ethylenedioxy - 1:2: 3:4:4aα:4b:5:6:7:8:10:10aβ - dodecahydrophenanthrene-1-ol in the form of fine needles of melting point 180–182° C.

The mother liquor (2.45 parts) is boiled with 5 parts of potassium hydroxide in 150 parts by volume of alcohol for 2 hours and then 50 parts by volume of water are added. The alcohol is then removed in vacuo and the aqueous mixture extracted with a mixture of chloroform and ether. The extracts washed with water and dried over sodium sulfate yield 0.268 part of residue (neutral part), from which by crystallization from a mixture of ether and petroleum ether 0.168 part of the 2α-hydroxymethyl-2β-allyl-4bβ-methyl-7-ethylene-dioxy-1:2:3:4:4aα: 4b:5:6:7:8:10:10aβ - dodecahydrophenanthrene - 1:4β-diol and melting at 182–184° C. (transformation at 165° C.) is isolated. The alkaline aqueous extracts are mixed with hydrochloric acid until the reaction is acid to Congo and extracted with chloroform. These extracts yield 1.39 parts of residue (acid+lactone). By crystallization from a mixture of acetone and ether there is obtained 0.73 part of (2→4β)-lactone of 2α - allyl - 2β - carboxy - 4bβ-methyl - 7 - ethylene - dioxy - 1:2:3:4:4aα:4b:5:6:7:8: 10:10aβ-dodecahydrophenanthrene-1:4β-diol melting at 233–237° C. The mother liquor is dissolved in a mixture of chloroform ether (3:1) and by extraction with a solution of sodium carbonate separated into acid and neutral portions. There is obtained 0.43 part of neutral product and 0.22 part of acid product. From the neutral portion there is obtained a further 0.225 part of the above lactone. The acid portions yield from ether the 2α - carboxy-2β-allyl-4bβ-methyl-7-ethylene-dioxy-1:2:3: 4:4aα:4b:5:6:7:8:10:10aβ - dodecahydrophenanthrene-1:4β-diol melting at 216–222° C.

1.2 parts of chromium trioxide are added in portions to 12 parts by volume of pyridine and mixed with 0.55 part of the above described lactone melting at 233–237° C. in 6 parts by volume of pyridine. The mixture is heated under nitrogen for 6 hours at 60–65° C., then diluted with chloroform, filtered and the residue washed with chloroform. The filtrate is evaporated in vacuo almost to dryness, the residue is taken up in a mixture of chloroform and ether and washed with water, hydrochloric acid, sodium carbonate solution and water. The solution dried over sodium sulfate is evaporated and the residue crystallized from a mixture of acetone and ether. There is obtained 0.36 part of the (2→4β)-lactone of 2α-allyl-2β-carboxy-4bβ-methyl-7-ethylene-dioxy - 1:2:3:4:4aα:4b:5:6:7:8:10:10aβ - dodecahydrophenanthrene-1-one-4β-ol melting at 185–189° C.

*Example 3*

The starting material used in Example 1 is prepared as follows:

4.4 parts of 4bβ-methyl-2-carbethoxy-4β-ethoxy-carboxy - 7 - ethylene-dioxy-1:3:4:4aα:4b:5:6:7:8:10:10aβ-dodecahydrophenanthrene-1-one in 20 parts by volume of absolute dioxane are reacted in a stirring vessel charged with glass balls in an atmosphere of nitrogen with 0.5 part of sodium hydride at room temperature, 3 parts by volume of methallyl iodide are introduced dropwise, and the whole is stirred for 6 hours at 55–65° C. After cooling the reaction mixture there are added first 5 parts by volume of ethanol, then, after diluting the mixture with a large amount of benzene, 20 parts of ice, and then the whole is stirred for a few minutes while cooling. The aqueous phase is separated from the organic phase and the latter is agitated with ice water. After drying and removing the solvent in vacuo there is obtained 4bβ - methyl-2-methallyl-2-carbethoxy-4β-ethoxy-carboxy-7 - ethylene - dioxy - 1:2:3:4:4aα:4b:5:6:7:8:10:10aβ-dodecahydrophenanthrene-1-one as a reddish oil. The separation into the two compounds isomeric at the carbon atom 2 is described below.

The 4bβ-methyl-2-carbethoxy-4β-ethoxy-carboxy-7-ethylene - dioxy-1:2:3:4:4aα:4b:5:6:7:8:10:10aβ-dodecahydrophenanthrene-1-one is prepared as follows:

4 parts of 4bβ-methyl-7-ethylenedioxy-1:2:3:4:4aα:4b: 5:6:7:8:10:10aβ-dodecahydrophenanthrene-4β-ol-1 - one in 12 parts by volume of diethyl carbonate and 20 parts by volume of absolute dioxane are stirred in a stirring vessel charged with glass balls in an atmosphere of nitrogen with 2 parts of sodium hydride for 12 hours at 55–65° C. After cooling, the reaction mixture is mixed with 10 parts by volume of ethanol, then diluted with benzene and extracted by agitation twice with a small quantity of ice water. The benzene solution is dried with potassium carbonate and, after removing the solvent in vacuo, yields 4bα-methyl-2-carbethoxy-4β-ethoxy-carboxy - 7 - ethylene - dioxy - 1:2:3:4:4aα:4b:5:6:7:8:10: 10aβ-dodecahydrophenanthrene-1-one, which is obtained by crystallization from petroleum ether in the form of colorless crystals melting at 115° C.

A mixture of 10.673 parts of 2-carbethoxy-4β-ethoxy-carboxy - 4bβ - methyl-7-ethylene-dioxy-1:2:3:4:4aα:4b: 5:6:7:8:10:10aβ-dodecahydrophenanthrene-1-one, 8.342 parts of finely pulverized anhydrous potassium carbonate, 183 parts by volume of anhydrous acetone and 69.4 parts by volume of methallyl iodide is vigorously stirred for 40 hours in an atmosphere of nitrogen at room temperature. It is then evaporated in vacuo at a temperature of at most 25° C., the residue is taken up in ice water and a mixture of ether and benzene (2:1), the organic phase is extracted at 0° C. with 1 N-potassium hydroxide and water, dried with sodium sulfate and evaporated in vacuo. By recrystallization from a mixture of isopropylether and petroleum ether there is obtained the pure 2α-methallyl-2β-carbethoxy-4β-ethoxy-carboxy-4bβ - methyl - 7-ethylene-dioxy-1:2:3:4:4aα:4b:5:6:7:8: 10:10aβ-dodecahydrophenanthrene-1-one melting at 99.5–101° C.

The residue obtained by evaporating the mother liquor is dissolved in a mixture of hexane and benzene (9:1) and chromatographed over 240 parts of aluminum oxide. As elutriating agents there are used successively mixtures of hexane and benzene (9:1) and (1:1) and benzene. From the first elutriate of hexane and benzene (1:1) there is obtained by crystallization from a mixture of isopropyl ether and petroleum ether a further quantity of pure 2α-methallyl-2β-carbethoxy-4β-ethoxycarboxy-4bβ - methyl - 7-ethylene-dioxy-1:2:3:4:4aα:4b:5:6:7:8: 10:10aβ-dodecahydrophenanthrene-1-one melting at 99.5–101° C. The subsequent fractions obtained with hexane and benzene (1:1) and benzene yield when crystallized from ethanol of 95 percent strength pure epimeric 2β - methallyl-2α-carbethoxy-4β-ethoxycarboxy-4bβ-methyl - 7 - ethylene-dioxy-1:2:3:4:4aα:4b:5:6:7:8:10:10aβ-dodecahydrophenanthrene-1-one melting at 94.5–95.5° C.

The 2-carbethoxy-4β-ethoxycarboxy-4bβ-methyl-7-ethylene - dioxy-1:2:3:4:4aα:4b:5:6:7:8:10:10aβ-dodecahydrophenanthrene-1-one used as starting material can be prepared as follows:

To a suspension of 5.848 parts of 4bβ-methyl-7-ethylene - dioxy-1:2:3:4:4aα:4b:5:6:7:8:10:10aβ-dodecahydrophenanthrene-1-one-4β-ol in 48.50 parts by volume of diethyl carbonate there are added 1.77 parts of sodium hydride and the mixture is stirred in an atmosphere of nitrogen first for 4 hours at room temperature and then 12 hours at 55–60° C. bath temperature. The reaction mixture is then cautiously mixed with 40 parts by volume of an anhydrous mixture of ethanol and ether (1:10) at 0° C. to destroy the excess sodium hydride and, after diluting with 98 parts by volume of ether, it is extracted successively with ice water, ice cold 1 N-potassium hydroxide and ice water. The ethereal solutions are dried with sodium sulfate and evaporated, the diethyl carbonate is removed in high vacuum, and the residue crystallized from a little ether. In this way there is obtained the pure 2-carbethoxy-4β-ethoxycarboxy-4bβ-methyl-7-ethylene-dioxy-1:2:3:4:4aα:4b:5:6:7:8:10:10aβ-dodecahydrophenanthrene-1-one melting at 115–116° C.

Example 4

The starting material used in Example 2 is prepared as follows:

To a suspension of 1.311 parts of 2-carbethoxy-4β-ethoxycarboxy-4bβ-methyl-7-ethylene-dioxy-1:2:3:4:4aα:4b:5:6:7:8:10:10aβ-dodecahydrophenanthrene-1-one in 22.5 parts by volume of anhydrous acetone there are added 1.038 parts of freshly calcined potassium carbonate, 7.5 parts by volume of freshly distilled allyl iodide and the whole is stirred for 48 hours under nitrogen at 25–28° C. The mixture is then concentrated in vacuo at 30° C. bath temperature to about 5 parts by volume, diluted with a mixture of benzene and ether (1:1) and washed with ice-water, ice-cold 1 N-caustic soda solution and water. The benzene-ether-solution dried with magnesium sulfate yields on evaporation 1.548 parts of a yellow oil. For the purpose of purification this crude product is chromatographed on 50 parts of aluminum oxide (activity II). With a mixture of hexane and benzene 9:1 only traces of impurities are removed, whilst with a mixture of hexane and benzene 1:1 a total of 1.265 parts of the two 2-allyl-2-carbethoxy-4β-ethoxy-carboxy-4bβ-methyl-7-ethylene-dioxy-1:2:3:4:4aα:4b:5:6:7:8:10:10aβ-dodecahydrophenantherene-1-ones epimeric at the carbon atom number 2 are extracted as a colorless oil which show no coloration with ferric chloride. The portions extracted with benzene and mixtures of benzene and ether still contain some starting material and show a dark red coloration with ferric chloride.

In place of allyl iodide, allyl chloride can be used for alkylations:

To a solution of 5 parts of 2-carbethoxy-4β-ethoxy-carboxy-4bβ-methyl-7-ethylene-dioxy - 1:2:3:4:4aα-4b:5:6:7:8:10:10aβ-dodecahydrophenanthrene - 1 - one in 100 parts by volume of acetone (anhydrous) there are added 4.5 parts of freshly calcined potassium carbonate, 35 parts by volume of allyl chloride and 3 parts of dried potassium iodide. The mixture is agitated for 3 days under nitrogen. It is then concentrated in vacuo at 30° C. to about 10 parts by volume, taken up in a mixture of chloroform and ether, washed with ice water, twice with ice-cold 1 N-caustic soda solution, then with water, and dried over sodium sulfate. The evaporated solution yields 5.38 parts of crude product which are chromatographed on 150 parts of aluminum oxide.

The fractions extracted with mixtures of benzene and petroleum ether, pure benzene and benzene with 5% ether weigh 3.4 parts, are amorphous and consist of a mixture of the two 2-allyl-2-carbethoxy-4β-ethoxycarboxy-7-ethylene-dioxy-1:2:3:4:4aα:4b:5:6:7:8:10:10aβ-dodecahydrophenanthrene-1-ones epimeric at the carbon atom number 2.

The fractions extracted with mixtures of ether and benzene, ether alone, chloroform and chloroform with 5% methanol yield from ether-petroleum ether 1.060 parts of crystalline starting material.

What is claimed is:

1. Process for the manufacture of new hydrophenanthrenes which comprises reducing a compound of the formula

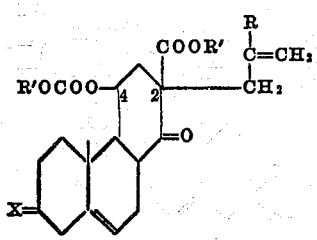

wherein X stands for a ketalized oxo group and R′ for lower alkyl and R for a member selected from the group consisting of a hydrogen atom and a methyl group with an alkalimetal borohydride, hydrolysing the ester functions in the hydroxyl compound obtained under alkaline conditions, acidifying the reaction mixture and dehydrogenating the free hydroxyl group in the 1-position of the (2→4)-lactones obtained to an oxo group.

2. Process according to claim 1, wherein sodium borohydride is used as reducing agent.

3. Process according to claim 1, wherein the pyridine-chromium trioxide complex is used as an oxidizing agent.

4. Process according to claim 1, wherein the 2α-methallyl-2β-carbethoxy-4β-ethoxycarboxy-4bβ-methyl-7-ethylenedioxy - 1:2:3:4:4aα:4b:5:6:7:8:10:10aβ - dodecahydrophenanthrene-1-one is used as starting material.

5. Process according to claim 1, wherein the 2α-allyl-2β-carbethoxy-4β-ethoxycarboxy-4bβ-methyl-7-ethylenedioxy - 1:2:3:4:4aα:5:6:7:8:10:10aβ - dodecahydrophenanthrene-1-one is used as starting material.

6. A compound of the formula

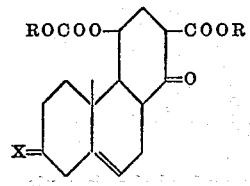

wherein R stands for lower alkyl and X represents lower alkylenedioxy.

7. The compound of the formula

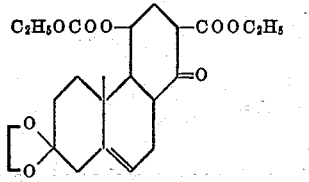

8. A compound of the formula

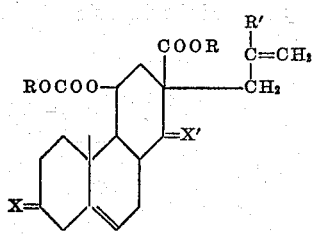

wherein R stands for lower alkyl, R′ for a member selected from the group consisting of a hydrogen atom and a methyl group, X′ represents a member selected from the group consisting of O and H(OH) and X stands for lower alkylenedioxy.

9. A compound of the formula

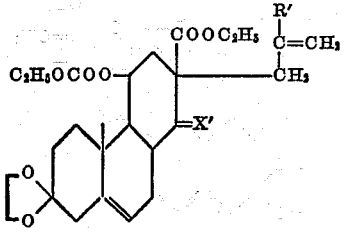

wherein R' stands for a member selected from the group consisting of a hydrogen atom and methyl group and X' for a member selected from the group consisting of O and H(OH).

10. The compound of the formula

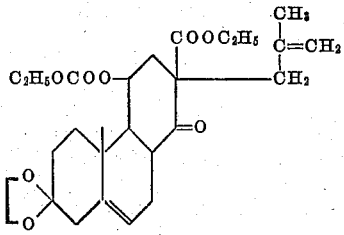

11. The compound of the formula

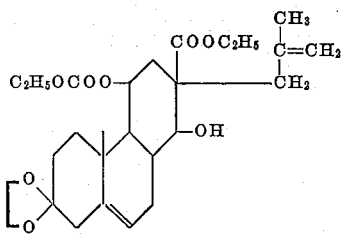

12. A compound of the formula

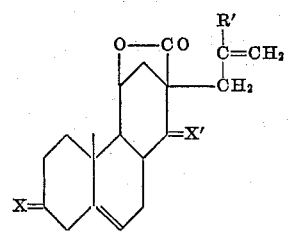

wherein R' stands for a member of the group consisting of a hydrogen atom and a methyl group, X' for a member of the group consisting of O and H(OH) and X represents lower alkylenedioxy.

13. A compound of the formula

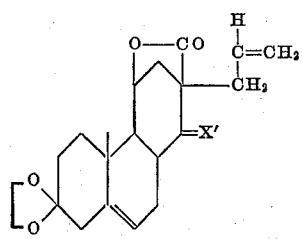

wherein X' stands for a member of the group consisting of O and H(OH).

14. The compound of the formula

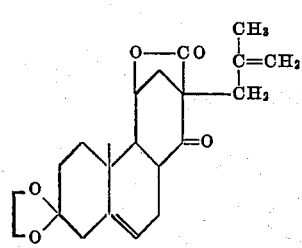

15. The compound of the formula

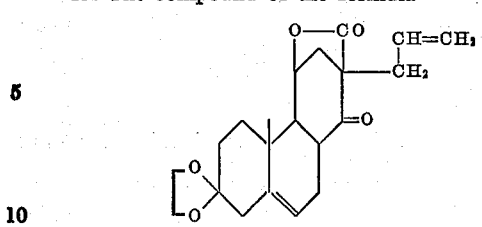

16. A compound of the formula

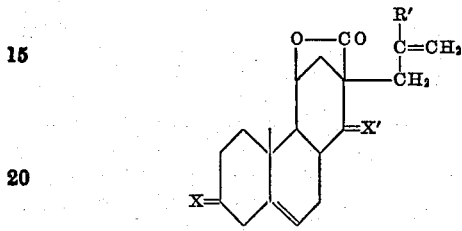

wherein R' represents a member of the group consisting of hydrogen and methyl, X' is a member of the group consisting of O and H(OH) and X represents lower alkylenedioxy.

17. A compound of the formula:

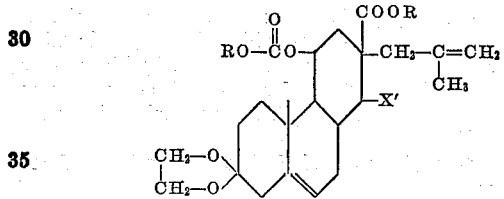

in which X' is selected from the group consisting of O and H(OH), and R is lower alkyl.

18. A compound of the formula:

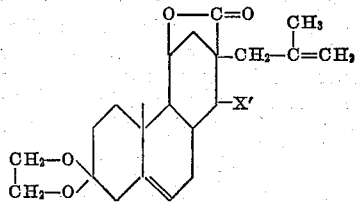

in which X' is selected from the group consisting of O and H(OH).

19. A compound of the formula:

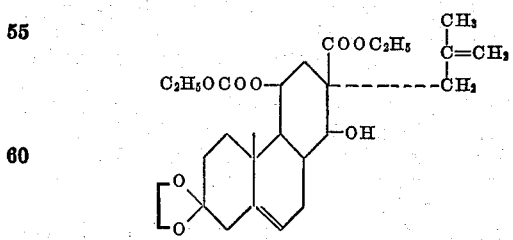

20. A compound of the formula:

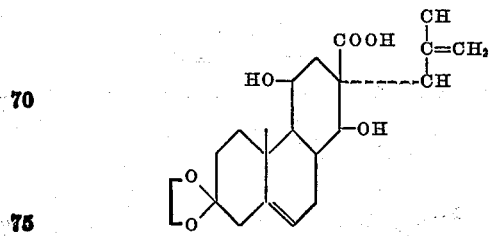

21. A compound of the formula:
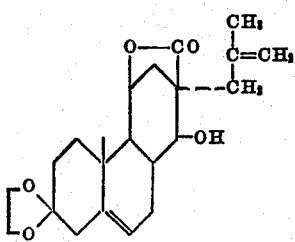
22. A compound of the formula:
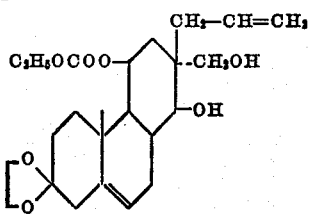
23. A compound of the fromula:
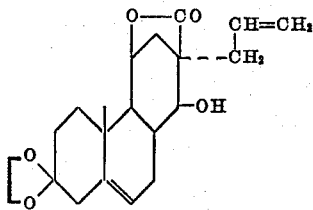
References Cited in the file of this patent
Schmidlin et al.: Experientia, vol. XI, pp. 365–368, September 15, 1955.